United States Patent [19]
Harrison et al.

[11] Patent Number: 5,936,009
[45] Date of Patent: Aug. 10, 1999

[54] FLUOROPOLYMER ADHESION

[75] Inventors: Larry Wayne Harrison, Bear; Lee Arnold Silverman, Newark, both of Del.

[73] Assignee: E. I. du Pont de Nemours and Company, Wilmington, Del.

[21] Appl. No.: 08/983,439

[22] PCT Filed: Jul. 10, 1996

[86] PCT No.: PCT/US96/11491

§ 371 Date: Jan. 8, 1998

§ 102(e) Date: Jan. 8, 1998

[87] PCT Pub. No.: WO97/02904

PCT Pub. Date: Jan. 30, 1997

Related U.S. Application Data

[60] Provisional application No. 60/000,882, Jul. 12, 1995.

[51] Int. Cl.$^6$ .................................................. C08K 9/00
[52] U.S. Cl. ............................................................ 523/215
[58] Field of Search ............................................. 523/215

[56] References Cited

U.S. PATENT DOCUMENTS

| | | | |
|---|---|---|---|
| 3,674,689 | 7/1972 | Giltrow et al. | 252/12.4 |
| 3,787,281 | 1/1974 | Effenberger | 161/188 |
| 3,804,802 | 4/1974 | Bergna | 260/42.16 |
| 4,902,444 | 2/1990 | Kolouch | 252/511 |
| 5,000,875 | 3/1991 | Kolouch | 252/511 |
| 5,024,871 | 6/1991 | Arthur et al. | 428/209 |
| 5,061,548 | 10/1991 | Arthur et al. | 428/209 |
| 5,384,181 | 1/1995 | Arthur et al. | 428/195 |

FOREIGN PATENT DOCUMENTS

| | | | |
|---|---|---|---|
| 764537 | 8/1967 | Canada | 400/66 |
| A 0 264 699 | 4/1988 | European Pat. Off. | G11B 5/72 |
| A 0 442 363 | 8/1991 | European Pat. Off. | C08K 3/36 |
| A 0 664 343 | 7/1995 | European Pat. Off. | C23C 16/02 |
| A 155885 | 7/1982 | German Dem. Rep. | B26B 21/54 |
| A 61-185863 | 8/1986 | Japan | H01M 4/38 |
| A 62-150527 | 7/1987 | Japan . | |
| 2 162 124 | 1/1996 | United Kingdom | B32B 15/04 |

OTHER PUBLICATIONS

Arkles, B.C. et al., "Wear Characteristics of Fluoropolymer Composites", *Polym. Sci. Technol, 5B* (*Adv. Polym. Frict. Wear*), 5B, pp. 663–688, 1974.

Brydson, J.A., *Plastics Materials*, 5th Ed., pp. 359–360, 1989.

*Primary Examiner*—Paul R. Michl

[57] ABSTRACT

A process for the improvement of adhesion between fluoropolymers or fluorocopolymers and inorganic compounds as well as composites made by this process are disclosed. The inorganic compound is coated with an adhesion promoter. Contacting the adhesion-promoted inorganic compound with the fluoropolymer or fluorcopolymer and heating develops the adhesive bond.

23 Claims, 2 Drawing Sheets

FLUOROPOLYMER ADHESION

CROSS-REFERENCE TO RELATED APPLICATIONS

This application claims the benefit of U.S. Provisional application 60/000,882, filed Jul. 12, 1995 and PCT International Application PCT/US96/11491, filed Jul. 10, 1996, wherein the United States was a designated country.

FIELD OF THE INVENTION

This invention concerns a process for the improvement of adhesion between fluoropolymers or fluorocopolymers and inorganic compounds and to composite materials made by this process.

TECHNICAL BACKGROUND

Various approaches have been used in the past in attempts to increase the adhesion between fluoropolymers and substrates or filler materials.

U.S. Pat. No. 3,787,281, Effenberger, discloses a process for bonding polytetrafluoroethylene to glass, fibers or plates, using a hydrolyzable silane or a methacrylato chromic chloride as bonding agent.

Canadian Patent No. 764,537 Bowman, discloses adhesive compositions suitable for use with fluorocarbon polymers comprising reactive (hydrolyzable) silanes or siloxanes. The fluorocarbon polymer is optionally pretreated with a solution of sodium in ammonia or a solution of sodium naphthalene in tetrahydrofuran.

U.S. Pat. No. 3,804,802, Bergna, discloses composites of thermoplastic resins, including polyfluoroolefins, with glass fiber materials utilizing a nitrate-containing coupling agent to increase adhesion between the components.

U.S. Pat. Nos. 4,902,444 and 5,000,875 disclose melt processable fluorinated tetrafluoroethylene copolymer and terpolymer compositions that are treated with a fluorinating agent to remove unstable end groups, then compounded with electrically conductive agents or thermally conductive fillers.

U.S. Pat. No. 5,024,871, Arthur, discloses a ceramic-filled fluoropolymeric composite wherein the filler, preferably fused amorphous silica, is coated with a zirconate or titanate coating. Said composite possesses excellent thermal, mechanical and electrical properties. U.S. Pat. Nos. 5,061, 548 and 5,384181, Arthur, disclose similar composites wherein the surface coating agent is a silane.

SUMMARY OF THE INVENTION

This invention provides a process for the improvement of adhesion between fluoropolymers or fluorocopolymers and inorganic compounds comprising the steps of 1) contacting the inorganic compound with an adhesion promoter to form a coated inorganic compound, 2) contacting the coated inorganic compound with the fluoropolymer or fluorocopolymer and 3) heating the coated inorganic compound-contacted, fluoropolymer or fluorocopolymer to a temperature sufficient to convert the adhesion promoter to a carbon-rich char.

This invention also includes composite materials made by the process. These composites of an inorganic compound and a fluoropolymer or fluorocopolymer have an interfacial layer of carbon-rich char which improves the adhesion of the inorganic compound to the fluoropolymer or fluorocopolymer.

DETAILED DESCRIPTION OF THE INVENTION

Figure 1:
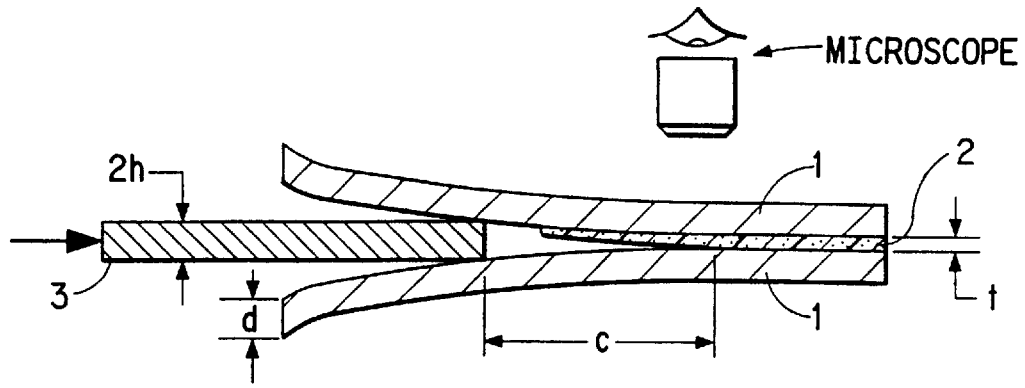
FIG. 1 is a schematic drawing of a sandwich specimen and the double cantilevered beam (DCB) experimental setup.

The process of the present invention concerns a process for the improvement of adhesion between fluoropolymers or fluorocopolymers and inorganic compounds.

Fluoropolymers or fluorocopolymers, hereinafter generally referred to as fluorochemicals, usable in the process of the present invention include poly(tetrafluoroethylene), PTFE (Teflon®); tetrafluoroethylene-hexafluoro-propylene copolymer, also referred to as fluorinated ethylene-propylene copolymer, FEP (Teflon® FEP); ethylene-tetrafluoroethylene copolymer, ETFE (Tefzel®); perfluoroalkoxy modified tetrafluoroethylenes, PFA, e.g., tetrafluoroethylene-perfluoropropylvinylether copolymer (Teflon® PFA); poly(chlorotri-fluorotetrafluoroethylene), PCTFE; vinylidene fluoride-tetrafluoroethylene copolymer, VF2-TFE; poly(vinylidene fluoride), (Kynar®); and tetrafluoroethylene-perfluorodioxole copolymers, (Teflon AF®). Included in the group of fluoroelastomers which are fluoropolymers or fluorocopolymers are vinylidene fluoride-hexafluoropropylene copolymer (Viton® A); vinylidene fluoride-hexafluoropropylene-tetrafluoroethylene terpolymer, (Viton® B); and tetrafluoroethylene-perfluoro (methylvinylether) plus cure site monomer terpolymer (Kalrez®).

Of the foregoing fluorochemicals preferred are tetrafluoroethylene-hexafluoropropylene copolymer, ethylene-tetrafluoroethylene copolymer, perfluoroalkoxy modified Tetrafluoroethylenes and tetrafluoroethylene-perfluorodioxole copolymers.

Inorganic compounds usable in the process of the present invention include but are not limited to alumina, silica, titania, zirconia, silicate glass, aluminum nitride, silicon carbide and boron carbide. The inorganic compound may exist in various physical forms, i.e., in the form of a powder, a solid shape having a surface, possibly a very smooth surface, or in the shape of a surface coating on a secondary substrate. This secondary substrate could, for example, be a metal. One specific example of the inorganic compound being a surface coating on a secondary substrate would be alumina on an aluminum metal secondary substrate.

Adhesion promoters usable in the process of the present invention are organic compounds that convert to carbon-rich chars at elevated temperatures in non-oxidizing environments. Suitable compounds include but are not limited to sucrose, sucrose octaacetate (SOA), abietic acid, poly (acrylic acid) and pitch.

Contacting the inorganic compound with the adhesion promoter may be accomplished by various methods depending on the state of the inorganic compound and the adhesion promoter. If, for example, the inorganic compound comprises a solid surface, either as a monolithic structure or as a surface coating on a secondary substrate, the inorganic compound's surface may be coated with a solution of the adhesion promoter in a compatible solvent. Other methods of coating including but not limited to deposition from a vapor phase, evaporation, sputtering, or even dusting the surface with powder are acceptable. If the inorganic compound is in the form of a powder and the adhesion promoter is a powder, powder mixers, such as a Tekmar powder mill may be employed. If the adhesion promoter is a liquid, the adhesion promoter may be added to the inorganic compound, then mixed in, for example, a Spex mill. Either solid or liquid adhesion promoters may be dissolved in a compatible solvent and coated on a surface, as described above, or added to the inorganic compound powder in that form.

Optionally the adhesion-promoter contacted inorganic compound may be dried, if solvent wet, prior to contacting it further with fluorochemical.

Contacting the adhesion-promoted inorganic compound with a melt processable fluorochemical is accomplished in various means depending on the physical form of both materials. If the adhesion-promoted inorganic compound is in the form of a powder, this is accomplished most easily by adding the solid to the fluorochemical in its molten state and using, for example, a Haake® melt compounder to assure uniformity. It is also possible to mix solid polymer with solid adhesion-promoted inorganic compound and heating the mixture prior to melting, accompanied by or prior to melting, followed by mixing. In either of the above two embodiments, this contacting step and the subsequent heating to elevated temperatures may be conducted essentially simultaneously.

If the adhesion-promoted inorganic compound comprises a solid surface, either as a monolithic structure or as a surface coating on a secondary substrate, the adhesion-promoted inorganic compound surface may be laminated with a film of solid fluorochemical, coated with a suspension of fluorochemical in an appropriate medium, or coated with a solution of the fluorochemical in a compatible solvent.

Heating the adhesion-promoted, inorganic compound-contacted fluorochemical to elevated temperatures to bring about the adhesive bond can be carried out in a melt state as described above for powdered form adhesion-promoted inorganic compound or between heated rolls, in sintering ovens or in a heated press for laminar structures.

The temperature utilized for bringing about the adhesive bond depends on the nature of the adhesion promoter, the nature of the fluoropolymer of fluorocopolymer and the nature of the inorganic compound. The temperature must be sufficient to convert the adhesion promoter to a carbon-rich char and below the temperature needed to thermally damage the other materials present. Temperatures above 250° C. are usually employed. Typically temperatures from 250° C. to about 375° C. are employed.

Optionally, pressure may be applied during the heating stage. This is most easily envisioned when the adhesion-promoted inorganic compound and fluorochemical are in laminar structure. If this general method is used, it is also optional to place pellets of the fluorochemical on the surface of the adhesion promoted inorganic compound, and rely upon the applied pressure to spread the fluorochemical onto the adhesion promoted surface.

The utility of the products of the process of the present invention depend on the physical form of the fluorochemical-adhesion-promoted inorganic compound construct. If the adhesion-promoted inorganic compound is in the form of a powder and this powder is dispersed in a fluorochemical matrix, depending on the nature of the inorganic compound, various advantageous properties may be developed in the fluorochemical-inorganic compound composite. For example, thermal or electrical conductivity of said composite may be attractive. If the fluorochemical-inorganic compound construct comprises an inorganic oxide surface-coated with a fluorochemical, the surface properties of said inorganic oxide may be advantageously modified with respect to, for example, durability, non-stick performance, corrosion resistance, or wetting characteristics.

Thermally conductive fluorochemicals are useful in heat exchanger tubes for use at elevated temperatures in corrosive environments and fuser rolls in copier machines. For maximum utility, the material should be processable by extrusion, and the properties of the material in use must include at least modest yield strength, failure strain and toughness.

In some cases, the filler material is selected to provide a high degree of thermal conductivity. The most preferred inorganic filler material is aluminum oxide powder, selected for its moderate thermal conductivity and excellent chemical resistance. In order to increase the thermal conductivity of the composite by a factor greater than 2, it is necessary to include greater than 20 volume percent of the highly thermally conductive phase into the fluorochemical. However, composites containing greater tan 60 volume percent filler are generally unacceptable due to incomplete filling of the interparticle space with matrix material. Even 20% by volume of filler has the potential of causing a problem in that the mechanical properties, such as ultimate strength and strain to failure, are degraded substantially without large increases in yield stress. This results in a decrease in toughness of the composite and decreases the utility of the material. The most accepted reason for the degradation of the mechanical properties with increased filler loading is that there is very little adhesion between the fluorochemical matrix and the filler phase. Therefore, at a certain strain, the interface fails, causing the formation of voids at the matrix/filler interface and subsequent yield and failure of the matrix. This invention relics on the creation of strong filler/matrix bonding so that the potential problem of composites with low yield stress is avoided.

The problem of sub-standard mechanical properties in filled fluorochemicals, for example in Teflon® PFA 350, has been examined previously. Teflon® PFA 350 is a tetrafluoroethylene-perfluoropropylvinylether copolymer obtained from the DuPont Company, Wilmington, Del. Unfilled PFA 350 has a yield stress of 15.16 MPa (2200 psi), an ultimate strength of 27.58 MPa (4000 psi) and a strain to failure of 330%. At low loadings of aluminum oxide in PFA, the ultimate stress an the failure strain remain quite high, but decrease as the aluminum oxide loading increases. At 5 and 10 percent by weight aluminum oxide, the ultimate stresses were 27.23 MPa (3950 psi) and 26.20 MPa (3800 psi), the yield stresses were 15.03 MPa (2180 psi) and 14.31 MPa (2075 psi), and the failure strains were 315% and 320% respectively. However, the thermal conductivity of these samples is only marginally improved over the unfilled matrix material. For more substantial improvements in thermal conductivity, upwards of 35% by weight aluminum oxide must be included in the fluorochemical matrix.

The mechanical properties of Teflon® PFA 350/aluminum oxide composites, especially where the filler loading is greater than 35% by weight but less than about 75% by weight, are improved by coating or mixing the aluminum oxide filler with a surface treating agent and subsequently combining the treated powder with the fluorochemical at an elevated temperature. The improved properties are believed to result from improved bonding of the filler powder to the fluoropolymer matrix relative to similar materials that contain uncoated aluminum oxide. This improved bonding results from the presence of an interfacial layer of carbon or carbon-rich char between the oxide and the fluoropolymer.

The most preferred filler used in the process of the present invention is aluminum oxide, however, other inorganic powders with suitable thermal conductivities may be substituted. Preferred thermally conductive fillers are defined as those with thermal conductivities greater than 10 watts per meter degree Kelvin. Preferred thermally conductive fillers are characterized by their having a small maximum primary particle size combined with a low level of agglomeration. Some grades of aluminum oxide usable in the process of the present invention include Showa AL-45H (most preferred), Showa AS40, Showa AS-10, Alcoa A-16 and General Abrasives Type 55. Aluminum oxide of the grades indicated can be purchased from Showa Denko America, New York, N.Y. and General Abrasives Co., Niagara Falls, N.Y.

A wide variety of particle sizes can be used for the filler material. For use in melt compounding, the preferred size range will have a mean particle size below 30 microns and a maximum less than 50 microns, with less than 10% of the material smaller than 0.1 microns. The most preferred distribution will have a mean less than 10 microns and a maximum less than 15 microns with less than 10% of the material smaller than 0.1 microns. Filler powders substantially greater in size than those in this range result in composites that fail at very low strains, while composites made from fillers that are substantially smaller than the preferred range result in materials that arc difficult to process due to their high viscosity during melt compounding. If processing routes other than melt compounding are used, powders with average particle sizes less than 1 micron, with a substantial fraction below 0.1 micron become more suitable.

Particle size distribution are conveniently determined with a Horiba LA-500 Laser Diffraction Particle Size Distribution Analyzer, available from Horiba Instruments Incorporated, Irvine, Calif. Samples are prepared by adding 0.5 g of powder to a 50 ml pyrex beaker. To this is added 20 ml of isopropanol. This mixture is sonicated until homogeneous in a Heat Systems Ultrasonics W-375 Sonicator/Cell Disruptor equipped with a 0.5 inch diameter ultrasonic horn. The Horiba small sample diffraction cell is filled to two thirds of its capacity with isopropyl alcohol, and the sonicated concentrate is added dropwise to the diffraction cell until the dilution is considered favorable as determined by the Horiba LA-500 instrument.

There are two important features of the surface treated filler particles that are adjusted so that the surface treated filler material can function in the process of the present invention. Small unagglomerated particles are needed in order to facilitate large strains-to-failure. Carbon coating of the filler particles causes adhesion between the particles and the fluorochemical matrix and therefore produces reinforcement of the matrix. Both of these features are essential to the formation of composites with optimal mechanical properties. Small, unagglomerated particles that do not adhere to the matrix provide sites for nucleation of porosity at the particles surfaces, called cavitation, which leads to low yield stresses and necking of the composites. Large or agglomerated particles that have good adhesion to the matrix cause reinforcement at very small strains, however, they fail at low strains relative to those desired. Having both features present, small unagglomerated particles and good particle/matrix adhesion, enables the fabrication of composites with the desired yield stress, ultimate stress and failure strain.

In the case of composites of this invention which are laminated structures improvement was measured in the adhesion of fluorochemicals to inorganic compounds using a double-cantilever-beam (DCB) geometry. This method was employed, in constant displacement mode, with appropriate sandwich specimens produced by laminating a specified fluorochemical film between inorganic oxide beams at elevated temperature and pressure. The DCB method, when used with transparent beams, has the advantage of allowing in situ observation of crack growth in a highly stabilizing crack-driving field. Adhesion is quantified in this geometry from the elastic energy released, G, in the inorganic oxide beam on extension of the delamination at the interface between the inorganic oxide beam and the fluoropolymer or fluorocopolymer film. Adhesion in these systems depends strongly on lamination temperature, passing through a maximum.

Double cantilever beam specimens consisting of a thin layer of fluorochemical inorganic oxide beams, as shown schematically in FIG. 1, were prepared using the following lamination procedure. The beam that were used were clean, highly-polished, inorganic oxide plates (1). The plates were coated prior to lamination with an adhesion promoting agent -sucrose octaacetate, by dip coating the inorganic oxide substrate in a warm 2% solution of sucrose octaacetate in isopropanol. A piece of fluorochemical film (2), 25 microns (0.001 S) thick, was carefully placed between two previously coated beams. The film was positioned to leave a section of the sandwich without film in order to generate a starter crack for mechanical testing. The loose sandwich was placed between Kapton®-lined tool steel platens in a hydraulic press and a force of 9 kN (2000 lb.) gradually applied. The platens were subsequently heated to a specified maximum temperature, at approximately 500° C./hr, held at that maximum temperature for 10 minutes, and allowed to cool naturally under a power off condition. The residual pressure was released and the Kapton® films stripped off the platens and the inorganic oxide beams. Excess fluorochemical film that was forced out of the sandwich during pressing was removed with a sharp blade.

Double-cantilever-beam (DCB) measurements were carried out in constant displacement mode by driving a steel blade (3) of known dimensions into the region without the fluorochemical film. The sandwich and blade arrangement were set up on a universal servo-hydraulic testing machine (Model 8100, MTS Systems Corp, Eden Prairie, Minn.) and the delamination between the inorganic beams and the fluorochemical observed in transmitted light using a long (40 cm) working distance microscope with an encoded vertical-travel stage, accurate to 10 microns (Questar QM 100, Questar Corp, New Hope, Pa.). The testing procedure consists of driving the steel blade into the interface and observing the subsequent delamination motion with the microscope. Because many inorganic oxides and thin fluoropolymer and fluorocopolymer films are transparent, the resulting crack could be imaged in transmitted light. The crack tip is clearly delineated by Fizeau interference fringes as crack opening displacements close to the tip approach dimensions of the wavelength of light. Delamination size measurements were made as a function of time, and the threshold crack length identified as the condition when no crack extension was observed over a 24 hr period.

Adhesion, in terms of the energy release rate, G, was determined for a constant wedging displacement, by noting that the energy required to separate the interface on unit crack extension is equal to the elastic strain energy released in the two cantilever beams as they unload on crack propagation:

$$G = \frac{3E'h^2d^3}{4c^4} \quad \text{Equation (1)}$$

with d the beam thickness; E, the plane strain Youngs's modulus; c, the crack length(4) (As in B. R. Lawn, "Fracture of Brittle Solids", Cambridge University Press, 1993). Blade thickness (2h) and beam thickness were measured to 1 mm accuracy using a micrometer prior to specimen fabrication.

Figure 2:
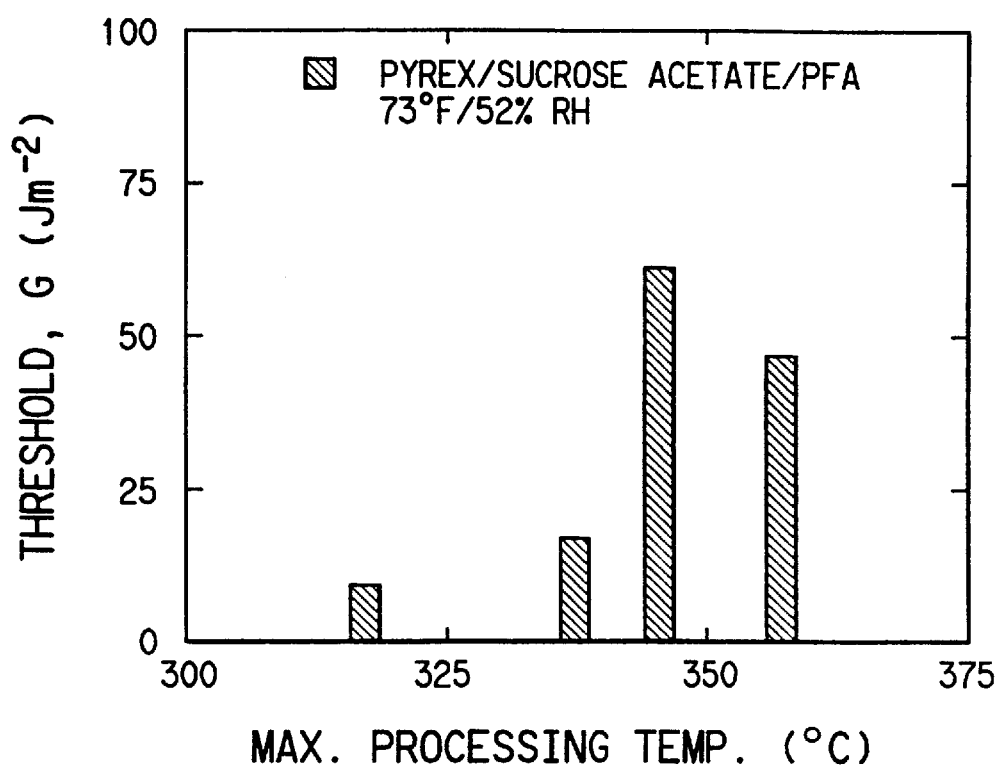
FIG. 2 shows adhesion level (G) as a function of lamination temperature for Teflon® PFA 350 on Pyrex® glass.

FIG. 2 plots the measured threshold adhesion level, G, as a function of maximum lamination temperature for the Teflon® PFA 350/sucrose acetate/Pyrex® system. Several features may be noted from these data. First, the adhesion level is strongly dependent on lamination temperature, starting at some 10 J.m$^{-2}$ at 315° C. and increasing to a maximum of some 60 J.m$^{-2}$ at around 345° C. Second, the adhesion appears to peak before decreasing at still higher temperatures. Excessive temperatures at which polymer degradation occurs may determine the upper lamination temperatures and lead to a peak in the adhesion energy.

Figure 3:
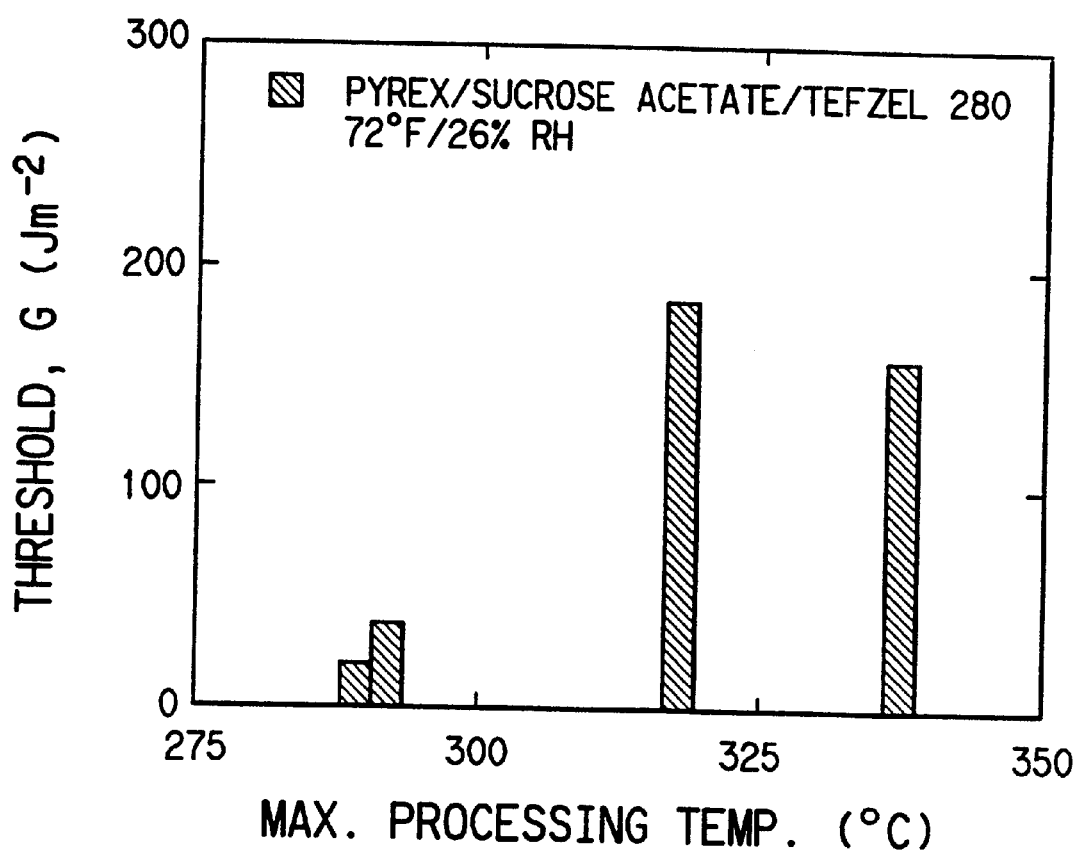
FIG. 3 shows adhesion level (G) as a function of lamination temperature for Tefzel® 280 on Pyrex® glass.

FIG. 3 plots the measured threshold adhesion level, G, as a function of maximum lamination temperature for the Tefzel® 280/sucrose acetate/Pyrex® system. Again the adhesion levels are strongly dependent on lamination temperatures, passing through a maximum.

The Tefzel® 280 containing laminate demonstrates higher adhesion levels than the Teflon® PFA 350 containing laminate and that peak adhesion is obtained at a lower processing temperature.

EXAMPLES

COMPARATIVE EXAMPLE 1

Pyrex®/SOA/PFA 350 Laminates

Sucrose octaacetate (2 parts) was dissolved in warm isopropanol (98 parts). Pyrex® plates, 25.4 mm×76.2 mm×0.762 mm(1S×3S×0.030), that had been polished on their largest faces, and degreased in isopropanol, were dipped into the warm sucrose octaacetate solution, leaving approximately one centimeter of the bar protruding above the surface of the solution for the purpose of gripping. The bars were withdrawn from the solution at a rate of roughly 15 centimeters per second, to yield a thin layer of solution adhering to the bar. The coated bar was allowed to dry under ambient conditions, leaving a white translucent layer of sucrose octaacetate on the surfaces of the bars. A film of Teflon® PFA 350, 25 microns thick, was placed over the broad side of one of the bars, leaving roughly 2 centimeters of the bar exposed at one end. On top of the Teflon® PFA 350 film was placed a second coated Pyrex® bar. The loose sandwich was placed between the Kapton®-lined tool steel platens of hydraulic press and a force of 9 kN (2000 lb.) gradually applied. The platens were subsequently heated to 315 degrees centigrade, at approximately 500° C./hr, held at that maximum temperature for 10 minutes, and allowed to cool naturally under a power off condition (overnight). The residual pressure was released and the Kapton® was mechanically stripped from the surfaces of the beams. The resulting double cantilever beams were tested as previously described. Adhesion results are shown in Table 1. Additional samples prepared in this method were immersed in boiling water and were shown to resist delamination for more than 24 hours.

COMPARATIVE EXAMPLE 2 AND

INVENTIVE EXAMPLES 3–4

These examples are identical to Example 1 with the exception that the maximum heating temperatures during pressing was varied. The conditions and results are shown in Table 1.

INVENTIVE EXAMPLES 5–7

These examples are identical to Example 1, with the exception that the fluorocopolymers used between the two Pyrex® plates was Tefzel® 280 with a thickness of 100 microns before pressing. The processing conditions and results are shown in Table 1.

COMPARATIVE EXAMPLE 8

This sample is identical to Example 1 with the exceptions that the Pyrex® bars were not coated with an adhesion promoting material prior to the lamination process, and the peak temperature during pressing was 350 degrees centigrade. Additional samples prepared in this method were immersed in boiling water and were shown to delaminate in less than 1 hour.

COMPARATIVE EXAMPLE 9

This sample is identical to example 5 with the exceptions that the Pyrex® bars are not coated with an adhesion promoting material prior to the lamination process, and the peak temperature during pressing was 295 degrees centigrade.

TABLE 1

Processing conditions and results for Examples 1 through 7 and Comparative Examples 8 and 9

| Example Number | Maximum Temperature (° C.) | Energy Release Rate (J/m$^2$) |
|---|---|---|
| 1 | 315 | 9 |
| 2 | 335 | 16 |
| 3 | 345 | 62 |
| 4 | 355 | 48 |
| 5 | 295 | 42 |
| 6 | 320 | 188 |
| 7 | 332 | 155 |
| 8 | 350 | 15 |
| 9 | 295 | 15 |

COMPARATIVE EXAMPLE 10

Composite with untreated Showa aluminum oxide as filler material.

65 parts Teflon® PFA 350 was melted in a 70 cubic centimeter Haake (mixer equipped with roller blades at 350° C. while running at 15 RPM. When the polymer was molten, 35 parts aluminum oxide (Showa AL-45H) was slowly added to the polymer. After the addition of the inorganic powder, the speed of the mixer was increased to 100 RPM, where it was held constant for 30 minutes. The temperature of the mixture was maintained at 350° C. by air cooling the mixer. After mixing, the cover of the mixer was removed, and the compounded polymer was cut out of the apparatus using copper/beryllium alloy knives. The irregularly shaped chunks were placed between steel plates lined with Kapton® film, and pressed to a thickness of roughly 2.5 mm (0.1 inches) using a Carver Press with heated platens that had been preheated to 350° C. Kapton® is a thermally stable polyimide film obtainable from the DuPont Company, Wilmington, Del. The steel/Kapton®/compounded PFA assembly was then moved to a water cooled press and cooled to room temperature while under pressure. The thick sheet was cut into smaller pieces, half of which were reloaded between Kapton® lined steel plates and reheated in the Carver press. The material was pressed to a thickness of roughly 1 mm (0.04 inches). The steel/Kapton®/compounded PFA assembly was then cooled as before in a water cooled press. Tensile bars (ASTM D1708) were cut from the sheets and tested in an Instron load frame that was equipped with a 91 kg (200 pound) load cell at 0.21 mm/sec (0.5 inches per minute). The results are reported in Table 2. Some of this material was observed while under strain in an optical microscope at a magnification of 200×. Suitable Leitz microscopes are available from Leica, Inc., Malvern, Pa. Cavitation at the matrix/filler interface was visible at strains less than 50%, and persisted until failure of the material.

COMPARATIVE EXAMPLE 11

Composite with calcined General Abrasive Type 55 aluminum oxide as filler material 35 parts aluminum oxide (General Abrasives Type 55) was calcined at 800° C. in air for two hours, and allowed to cool to room temperature. The previously heated powder was then added to the polymer in place of the Showa AL-45H and processed as in Comparative Example 10.

INVENTIVE EXAMPLE 12

Composite with poly(acrylic acid) treated Showa aluminum oxide as filler material 50 parts aluminum oxide (Showa AL-45H) was loaded into a Tekmar Powder Mill. One part of poly(acrylic acid) powder, molecular weight 5000 was poured over the top of the aluminum oxide. Poly(acrylic acid) can be obtained from Aldrich Chemical Company, Milwaukee, Wisconsin, The cover was installed on the mill and the mill started. The resulting powder mixture appeared to be uniform in color. 35 parts of this powder mixture was added to molten Teflon® PFA 350 as in example 10, substituted for the Showa AL-45H aluminum oxide.

INVENTIVE EXAMPLE 13

Composite with abietic acid treated Showa aluminum oxide as filler material 50 parts aluminum oxide (Showa AL-45H) was loaded into a Spex Vibratory Mill. One part of abietic acid powder was poured over the top of the aluminum oxide powder. Abietic acid is obtainable from the Fluka Chemical Company, New York, N.Y. The cover was installed on the mill and the mill started. The resulting powder mixture appeared to be uniform in color. 35 parts of this powder mixture was added to molten Teflon® PFA 350 as in Example 10, substituted for the Showa AL-45H aluminum oxide.

INVENTIVE EXAMPLE 14

Composite with sucrose octaacetate treated Showa aluminum oxide as filler material 50 parts aluminum oxide (Showa AL-45H) was loaded into a Spex Vibratory Mill. One part of sucrose octaacetate powder was poured over the top of the aluminum oxide powder. Sucrose octaacetate can be obtained from Aldrich Chemical Company, Milwaukee, Wis. The cover was installed on the mill and the mill started. The resulting powder appeared to be uniform in color. 35 parts of this powder mixture was added to molten Teflon® PFA as in Example 10, substituted for the Showa AL-45H aluminum oxide. Some of this material were observed while under strain in an optical microscope at a magnification of 200×. Cavitation at the matrix/filler interface was not observed up until and including the failure of the material.

INVENTIVE EXAMPLE 15

Composite with calcined sucrose octaacetate treated Showa aluminum oxide as filler material This example was identical to Example 14 with the exception that the mixed aluminum oxide/sucrose octaacetate powders were calcined under nitrogen at 375° C. for one hour and allowed to cool to room temperature under nitrogen prior to mixing the powders with the Teflon® PFA 350.

TABLE 2

Mechanical Properties of Example 10 to 15

| EXAMPLE NO. | MAXIMUM STRESS (MPa/PSI) | STRAIN AT FAILURE (%) |
| --- | --- | --- |
| 10 | 15.38/2231 | 211* |
| 11 | 18.31/2656 | 268* |
| 12 | 19.30/2799 | 102 |
| 13 | 22.27/3230 | 123 |
| 14 | 22.50/3263 | 159 |
| 15 | 19.93/2891 | 155 |

*Indicates that the sample formed a stable neck that extended until it reached the tabs on the tensile bar, at which point the sample broke

ADDITIONAL EXAMPLES

In Examples 16 through 26, all compositions are described in parts by weight. Unless otherwise indicated in Table 3, sucrose octaacetate is used as the material to promote adhesion between the filler particles and the fluoropolymer matrix. Where present, the amount of sucrose octaacetate is indexed to the amount of aluminum oxide at 1 part of sucrose octaacetate to 10 parts aluminum oxide. The thermal conductivity is compiled in W/m/0K, while the failure strain is listed in percent and the yield stress is compiled in megapascals (pounds per square inch). All of these samples were mixed as in Example 14 above. In Table 3, all composites except Example 21 use Showa's AL-45H aluminum oxide powder as the filler. Example 21 uses Showa's AS-10 aluminum oxide powder as the filler Examples 16, 22, 24 and 25 were fabricated without sucrose octaacetate as comparative examples, while Samples 23 and 24 use PFA 450 as the fluoropolymer matrix and Examples 26 and 27 use FEP 140 as the fluoropolymer matrix.

| EX. # | Parts Fluoropolymer | Parts Alumina | Failure Strain | Failure Stress (MPa/psi) | Thermal Conductivity |
| --- | --- | --- | --- | --- | --- |
| 16 | 100 | 0*** | 337 | 25.70/3728 | .22 |
| 17 | 65 | 35 | 124 | 22.40/3249 | .44 |
| 18 | 55 | 45 | 97 | 26.55/3851 | .68 |
| 19 | 45 | 55 | 58 | 25.86/3751 | .92 |

-continued

| EX. # | Parts Fluoro-polymer | Parts Alumina | Failure Strain | Failure Stress (MPa/psi) | Thermal Conductivity |
|---|---|---|---|---|---|
| 20 | 35 | 65 | 36 | 25.85/3749 | 1.14 |
| 21 | 35 | 65* |  |  | 1.36 |
| 22 | 65** | 35*** | 256 | 15.62/2251**** |  |
| 23 | 65** | 35 | 148 | 24.99/3625 |  |
| 24 | 65 | 35*** | 254 | 18.73/2716**** |  |
| 25 | 65@ | 35*** | 62 | 17.40/2523 |  |
| 26 | 65@ | 35 | 120 | 2105/3053 |  |

*Showa AS-10
**Post Fluorinated PFA 350 as matrix (PFA 450)
***No sucrose octaacetate (Comparative Examples)
****sample necked
@ FEP 140 as matrix

We claim:

1. A process for improving adhesion between an inorganic compound and a fluorochemical selected from the group consisting of fluorohomopolymers, fluorocopolymer and fluoroelastomers comprising contacting the inorganic compound with an adhesion promoter to form a coated inorganic compound, contacting the coated inorganic compound with the fluorochemical to form a fluorochemical-coated inorganic compound combination and heating the combination to a temperature sufficient to convert the adhesion promoter to a carbon-rich char.

2. The process of claim 1 wherein the adhesion promoter is a member selected from the group consisting of sucrose, sucrose octaacetate, abietic acid, poly(acrylic acid), and pitch.

3. The process of claim 1 wherein the inorganic compound is a member selected from the group consisting of alumina, silica, titania, zirconia, silicate glass, aluminum nitride, silicon carbide and boron carbide.

4. The process of claim 2 wherein the inorganic compound is a member selected from the group consisting of alumina, silica, titania, zirconia, silicate glass, aluminum nitride, silicon carbide and boron carbide.

5. The process of claim 1 wherein the fluorochemical is a member selected from the group consisting of poly (tetrafluoroethylene), tetrafluoroethylene-hexafluoropropylene copolymer, ethylene-tetrafluoroethylene copolymer, perfluoroalkoxy modified tetrafluoroethylenes, poly(chlorotrifluorotetrafluoroethylene), vinylidene fluoride-tetrafluoroethylene copolymer, poly(vinylidene fluoride), tetrafluoroethylene-perfluorodioxole copolymers, vinylidene fluoride-hexafluoropropylene copolymer, vinylidene fluoride-hexafluoropropylene-tetrafluoroethylene terpolymer, and tetrafluoroethylene-perfluoromethylvinylether) plus cure site monomer terpolymer.

6. The process of claim 4 wherein the fluorochemical is a member selected from the group consisting of poly (tetrafluoroethylene), tetrafluoroethylene-hexafluoropropylene copolymer, ethylene-tetrafluoroethylene copolymer, perfluoroalkoxy modified tetrafluoroethylenes, poly(chlorotrifluorotetrafluoroethylene), vinylidene fluoride-tetrafluoroethylene copolymer, poly(vinylidene fluoride), tetrafluoroethylene-perfluorodioxole copolymers, vinylidene fluoride-hexafluoropropylene copolymer, vinylidene fluoride-hexafluoropropylene-tetrafluoroethylene terpolymer, and tetrafluoroethylene-perfluoromethylvinylether) plus cure site monomer terpolymer.

7. The process of claim 6 wherein the fluorochemical is a member selected from the group consisting of ethylene-tetrafluoroethylene copolymer, tetrafluoroethylene-hexafluoropropylene copolymer, perfluoroalkoxy modified tetrafluoroethylenes, and tetrafluoroethylene-perfluorodioxole copolymers.

8. The process of claim 1 wherein the combination is heated to a temperature of from about 250° C. to about 375° C.

9. The process of claim 4 wherein the combination is heated to a temperature of from about 250° C. to about 375° C.

10. The process of claim 5 wherein the combination is heated to a temperature of from about 250° C. to about 375° C.

11. The process of claim 7 wherein the combination is heated to a temperature of from about 250° C. to about 375° C.

12. The process of claim 11 wherein the inorganic compound is alumina.

13. A composite of an inorganic compound and a fluorochemical selected from the group consisting of fluorohomopolymers, fluorocopolymers and fluoroelastomers wherein the inorganic compound is bonded to the fluorochemical by an interfacial layer of carbon-rich char.

14. The composite of claim 13 wherein the inorganic compound is a member selected from the group consisting of alumina, silica, titania, zirconia, silicate glass, aluminum nitride, silicon carbide and boron carbide.

15. The composite of claim 13 wherein the fluorochemical is a member selected from the group consisting of poly (tetrafluoroethylene), tetrafluoroethylene-hexafluoropropylene copolymer, ethylene-tetrafluoroethylene copolymer, perfluoroalkoxy modified tetrafluoroethylenes, poly(chlorotrifluorotetrafluoroethylene), vinylidene fluoride-tetrafluoroethylene copolymer, poly(vinylidene fluoride), tetrafluoroethylene-perfluorodioxole copolymers, vinylidene fluoride-hexafluoropropylene copolymer, vinylidene fluoride-hexafluoropropylene-tetrafluoroethylene terpolymer, and tetrafluoroethylene-perfluoromethylvinylether) plus cure site monomer terpolymer.

16. The composite of claim 13 wherein the fluorochemical is a member selected from the group consisting of ethylene-tetrafluoroethylene copolymer, tetrafluoroethylene-hexafluoropropylene copolymer, perfluoroalkoxy modified tetrafluoroethylenes, and tetrafluoroethylene-perfluorodioxole copolymers.

17. The composite of claim 14 wherein the fluorochemical is a member selected from the group consisting of ethylene-tetrafluoroethylene copolymer, tetrafluoroethylene-hexafluoropropylene copolymer, perfluoroalkoxy modified tetrafluoroethylenes, and tetrafluoroethylene-perfluorodioxole copolymers.

18. The composite of claim 17 wherein the inorganic compound is alumina.

19. The composite of claim 17 wherein the composite is from about 35% by weight to about 75% by weight alumina.

20. A composite of claim 14 wherein the inorganic compound is in the form of solid surface.

21. A composite of claim 14 wherein the inorganic compound is in the form of a powder.

22. A composite of claim 18 wherein the inorganic compound is in the form of a solid surface.

23. A composite of claim 18 wherein the inorganic compound is in the form of a powder.

* * * * *